United States Patent
Mostovsky

[11] Patent Number: 5,956,887
[45] Date of Patent: Sep. 28, 1999

[54] BLADE, AND SPINNER TYPE LURE PROVIDED THEREWITH

[76] Inventor: Leonid Mostovsky, 167 Pembrook Rd., Brooklyn, N.Y. 11235

[21] Appl. No.: 08/708,293

[22] Filed: Sep. 4, 1996

[51] Int. Cl.$^6$ ..................................................... A01K 85/00
[52] U.S. Cl. ............................................................. 43/42.19
[58] Field of Search ................................. 43/42.11, 42.13, 43/42.19

[56] References Cited

U.S. PATENT DOCUMENTS

| | | | |
|---|---|---|---|
| 1,856,043 | 4/1932 | Pflueger | 43/42.19 |
| 2,215,764 | 9/1940 | Okesson | 43/42.19 |
| 2,611,984 | 9/1952 | Gautsche | 43/42.19 |
| 2,612,715 | 10/1952 | Wadlington | 43/42.19 |
| 2,619,761 | 12/1952 | Homa | 43/42.19 |
| 2,660,827 | 12/1953 | Pero | 43/42.19 |
| 2,674,823 | 4/1954 | Gellings | 43/42.19 |
| 2,877,592 | 3/1959 | Basgall | 43/42.19 |
| 2,940,204 | 6/1960 | Mehnert | 43/42.19 |
| 3,750,325 | 8/1973 | Feltman | 43/42.19 |
| 3,987,576 | 10/1976 | Strader | 43/42.19 |
| 4,016,671 | 4/1977 | Larsen | 43/42.19 |
| 4,628,629 | 12/1986 | Rocchietta | 43/42.19 |

FOREIGN PATENT DOCUMENTS

| | | | |
|---|---|---|---|
| 879466 | 11/1942 | France | 43/42.19 |
| 560221 | 3/1944 | United Kingdom | 43/42.19 |

*Primary Examiner*—Kurt Rowan
*Attorney, Agent, or Firm*—Ilya Zborovsky

[57] ABSTRACT

A spinner blade for in-line fishing spinner type lures a blade body having a head end with a dull, elliptical-shape and a tail end which is pointed on plan view, a single opening provided in the region of the head end for a wire shaft, a groove extending from the opening for accommodating the wire shaft, the blade body having a convex-shape over a whole length from the head end to the tail end with the exception of the groove.

8 Claims, 2 Drawing Sheets

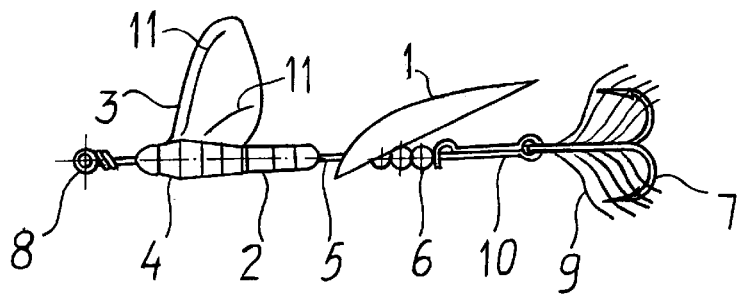
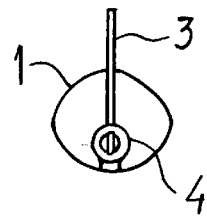
FIG.1  FIG.2
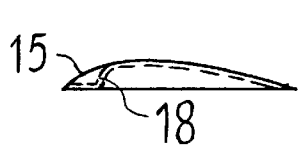 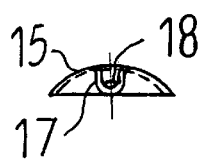 
FIG.3  FIG.5  FIG.6
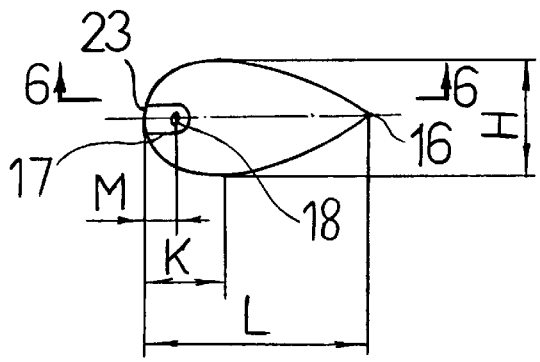 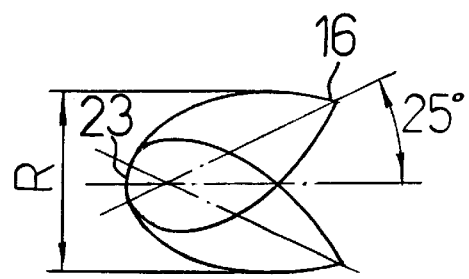
FIG.4  FIG.7
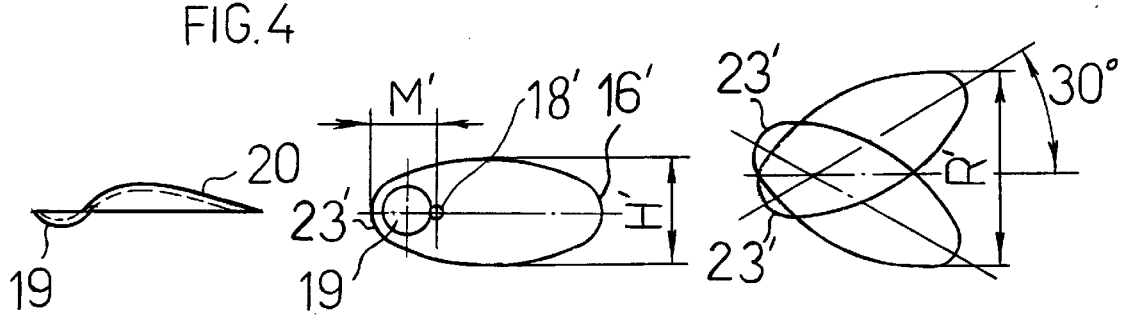
Prior art FIG.8  Prior art FIG.9  Prior art FIG.10

BLADE, AND SPINNER TYPE LURE PROVIDED THEREWITH

BACKGROUND OF THE INVENTION

The present invention relates to a blade as well as to a fishing lure provided with it, especially of the type known as spinner lures.

Standard spinner lures are produced in many types. The most common type has a blade mounted on a shaft by a U-shaped revolving arm or clevic. The spinner lure of another type known as in-line lure or sonic or through-blade spinner does not use a clevic. Instead, the spinners of these types have a blade that spins directly on the shaft. The best known in-line spinner is Italian Panther Martin spinner. In these spinners, the shaft passes directly through a hole drilled in the blade.

Rotor type spinners have blades with an extended arm or arms, with two bearing points for the wire shaft. June Bug type spinners have blades with a stamped-out arm and provided with two holes as bearing points. Rotor type blades and June Bug type blades do not have angular freedom, and the blade rotates at a constant angle to the shaft. In a swivel type spinner, the spinner blade is attached to a split ring with a swivel in front of it.

SUMMARY OF THE INVENTION

Accordingly, it is an object of present invention to provide a blade and a spinner lure with in-line type of attachments to the shaft, which is a substantial improvement over the existing blades and lures.

In keeping with these objects and with others which will become apparent hereinafter, one feature of present invention, resides, briefly stated in a blade for in line spinner lure, which has an asymmetric edge with a rounded or elliptical dull head end and a pointed end, with a continuous convex shape from the head end to the rear end.

In such a blade a hole for the wire shaft is closer to the head end of the blade when compared with the blades of known spinner lures. Also, the convex surface extends over a greater area. The shape of the blade reduces a turning angle of the blade to the axis. Moreover, the pattern of motion of the blade in water is changed.

In accordance with still another feature of present invention, the blade is formed so that when it turns around the axis of the opening for the wire shaft, the head end of the blade does not project forwardly beyond a contour of the head ends in all angular positions of the blade.

In accordance with another feature of the present invention, the spinner lure is provided with the blade having the above mentioned new features and in addition, a translucent vertical wing is located in front of the blade. It eliminates disadvantageous line twist and a simultaneously acts as an additional means for attracting game fish. It is known that the revolving spinner blade produces the beat which can be observed through vibrations of the end of the fishing rod. The vertical wing in accordance with the present invention participates in this vibration so as to imitate a motion of aquatic insect.

In accordance with still a further feature of present invention, the wire shaft can be composed of two shaft parts which are connectable with one another by eye loops. This provides separation of a wing part and a blade part of the lure, so that the wing portion of the lure is displaceable relative to the spinner portion by changing the speed of retrieving. In other words, the lure has the ability to raise and lower the wing portion relative to the spinner portion.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1 and 2 are a side view and an end view of a spinner lure in accordance with the present invention;

FIGS. 3, 4 and 5 are a side view, a plan view and an end view of the blade of the inventive spinner lure.

FIG. 6 is a view showing a section of the inventive blade taken along the line A—A in FIG. 4;

FIG. 7 is a view showing several positions of the inventive blade during turning about an axis of an opening for a wire shaft;

FIGS. 8, 9 and 10 are views substantially corresponding to the views of FIGS. 3, 4 and 7, but for a blade in accordance with the prior art.

DESCRIPTION OF PREFERRED EMBODIMENTS

Figure 11:
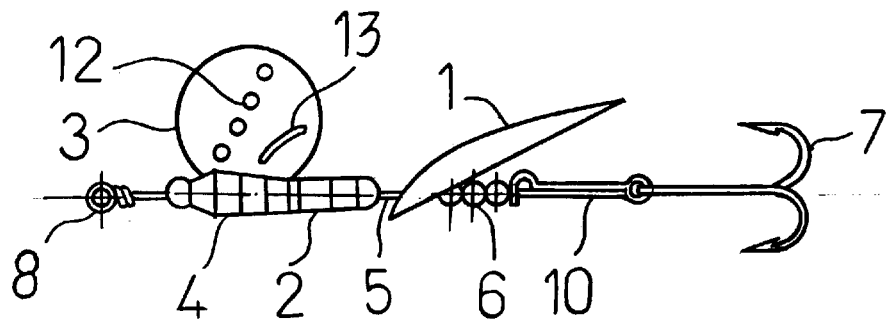
FIGS. 11, 12, 13 and 14 are side views showing a spinner lure in accordance with further modifications of the present invention.

A fishing lure in accordance with the present invention is shown in FIG. 1. It has a new blade of an in-line type as identified with reference numeral 1. A weighted body 2 is located behind a plastic body 4 provided with a vertical wing 3 extending vertically upwardly. The parts 2, 3, and 4 are secured on a wire shaft 5 and constitutes an insect-shaped portion of the lure. The weighted body 2 is composed of metal, such as brass or lead molded to the wire shaft 5. The plastic body 4 and the wing 3 can be made from hard or soft plastic and can be secured to the wire shaft or to the weighted body. In order to increase attractiveness, the wing 3 is composed of translucent plastic and can have different shades and decorative elements. The wire shaft 5 has an eye loop 8 for tying the fishing line, and a snap closure 10 to accommodate a fishing hook 7. The hook can be formed as a regular hook or as a weedless single, double, or treble hook. A dressing 9 can be provided to disguise the treble. The dressing can be made for example from bucktail. The lure further has beads 6 which serve as a spacer and a bearing for easy turning of the blade.

The blade 1 has a smaller angle of pivoting around the axis, and does not have a concave portion of the prior art blades shown in FIG. 8. In the known blades the front concave portion constantly turns in an opposite direction relative to the convex portion. Also, in the blade 1 of the invention a distance between the opening 18 for the wire shaft and the head end of the blade is reduced. The new shape of the blade results in changed pattern of turning of the blade in water.

The plastic wing 3 is located in the insect-shaped portion of the lure. When the lure runs through water, the wing 3 enables the lure to maintain a proper vertical orientation, preventing line twist. Furthermore, the wing 3 vibrates with the same frequency as the rotation of the blade and creates a blurring image of the wing appealing to a fish sight. The parts 4 and 2 have a cylindrical shape to resemble the insect body. The plastic wing can be slightly colored and can have different variety of tints, to provide greater appeal in different fishing conditions. The revolving spinner blade is a basic attracting element, and it attracts fish by flash and vibration.

The shape of the blade is important because it determines the rotational speed and angle and thereby the movement of the lure in the water.

In the prior art blade shown in FIGS. 8, 9 and 10 which is known from Italian Panther Martin lure a maximum width is located in its central part. It has a concave surface at the head end and a convex surface at the tail end. The concave portion has spherical shape, and an opening for a wire shaft is located at the end of the concave spherical surface. In contrast, as can be seen from the drawings, the inventive blade 1 has a convex shape over its whole length from the head end to the tail end with the exception of the groove 17 located between the head end and the opening 18 for the wire shaft. Also, the opening 18 is located closer to the head end than in the known blades. The groove 17 is formed so that its bottom is located in the region of a plane in which the edge of the blade is located. In the upper area, the groove 17 smoothly merges into the convex part 15 of the blade as shown in FIG. 5. As can be seen from FIG. 6, the convex surface of the blade extends over its whole length from the head end to the tail end and transversely between the side ends. In contrast, in the prior art blade shown in FIG. 8 there is a region 19 which is not convex. Also, the head end of the blade 1 of the invention has an elliptic, dull shape which then smoothly narrows toward the pointed tail end 16 of the blade. The maximum width H is displaced from the center of the blade toward the head end and located at a distance K from the head end. Therefore the angle of pivoting of the blade around the axis is reduced when compared with the known blades, and the pattern of the motion of the blade in water is changed.

Turning now to FIGS. 7 and 10, it can be seen that the inventive blade 1 has a smaller amplitude and pivoting angle than the prior art blade, as can be seen from the comparison of the values R and R'. Also, during pivoting of the inventive blade 1, the heads end is always located within a contour described by the head ends of different positions, of the blade as shown in FIGS. 7. In contrast, in the prior art, portions 23' in FIG. 10 extends forwardly beyond the contour of the head ends of different positions, so as to form a contour composed of several small curved portions. In the inventive blade, during pivoting of the blade and its location in a plurality of different positions, the contour of the head ends 23 of the blade is a single, integral curved portion. This integral curved portion of the head end of the blade improves its characteristics and attractiveness to fish. At the same time the blade maintains such properties as fast start of rotation at a low retrieving speed, and low water resistance.

FIG. 11 shows a further embodiment of the present invention.

Figure 12:
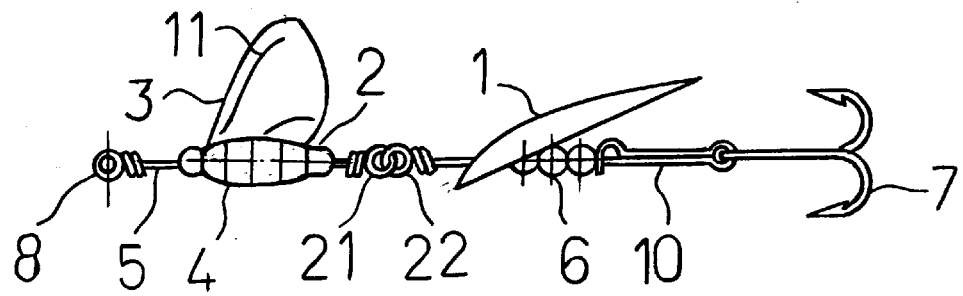

Here the wing 3 is provided with a plurality of openings formed for example as circular holes 12 and elongated slots 13. Also, ribs can be provided on the side surfaces of the wing. These formations provided on the wing present additional attractive elements for fish. FIG. 12 shows still a further embodiment of the fishing lure of FIG. 1. Here, the wire shaft is composed of two shaft portions connected with one another by two eye loops 21 and 22. In this construction the wing portion of the lure and the spinner portion of the lure are separated from one another and also are movable relative to one another. This construction utilizes the property of "beat" of the blade described herein above. The eye loops are connected with one another with a play so that short and sharp jerking movements are performed. With such movements the contour of the wing becomes foggy so as to more closely imitate a wing of a live insect.

Figure 13:
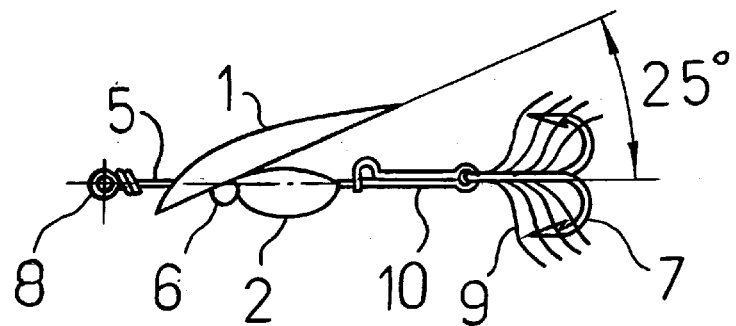

FIG. 13 shows the use of the inventive spinner blade in a known spinner lure in which the weighted body 2 is located behind the blade 1. The body 2 is composed of an elongated piece of metal, the wire shaft 5 extends through the blade 1, the beads 6 serve to reduce friction, the hook 7 is attached to the loop 14, and the eye loop 8 serves for attachment of the fishing line. With the above explained advantages, including a low pivoting angle of approximately 25° around the axis, the inventive blade imparts new properties to the lure and higher attractiveness.

Figure 14:
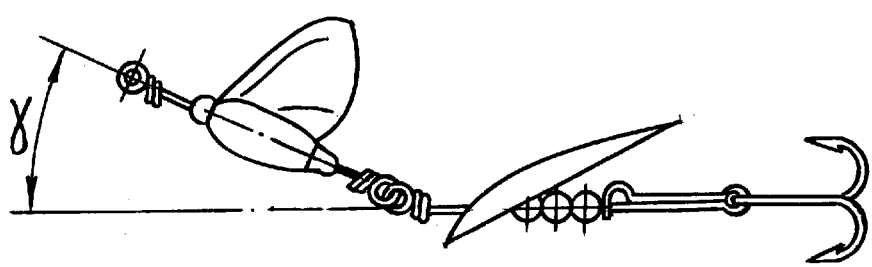

Finally, FIG. 14 shows a change of the angle between the wing portion and the spinner portion of the lure. With reduction of the lure retrieving speed, the angle between these portions increases. Correspondingly, the vibration frequency and angle of inclination of the wing are changed. The changes in the angle of inclination produce additional enticing affect for game fish.

It will be understood that each of the elements described above, or two or more together, may also find a useful application in other types of constructions differing from the types described above.

While the invention has been illustrated and described as embodied in blade and spinner type lure provided therewith, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An in-line spinner type lure, comprising a wire shaft; a blade attached to a wire shaft, said blade having a blade body having a head end with a dull elliptical-shape and a tail end which is pointed on plan view, a single opening provided in the region of said head end for said wire shaft, a groove extending from said opening for accommodating said wire shaft, said blade body having a convex-shape over a whole length from said head end to said tail end with the exception of said groove; a weighted body; means for attachment of a fishing line; a hook attached to said wire shaft, said weighted body having a translucent vertical wing shaped substantially as an insect wing and located in front of and above said weighted body.

2. A spinner type lure as defined in claim 1, wherein said vertical wing has a round shape.

3. A spinner type lure as defined in claim 1, wherein said vertical wing has a plurality of openings.

4. A spinner type lure as defined in claim 3, wherein said openings of said vertical wing are formed as circular holes.

5. A spinner type lure as defined in claim 3, wherein said openings of said vertical wing are formed as elongated slots.

6. A spinner type lure as defined in claim 1, wherein said weighted body provided with said translucent vertical wing is located in front of said blade.

7. A spinner type lure as defined in claim 1, wherein said wire shaft has two portions connected with one another by eye loop means, one of said portions carrying said weighted body with said wing, while the other of said portions carrying said blade.

8. A spinner type lure as defined in claim 1, wherein said weighted body is located behind of said blade.

* * * * *